(12) United States Patent
Hafenscher et al.

(10) Patent No.: US 8,346,598 B2
(45) Date of Patent: Jan. 1, 2013

(54) APPARATUS FOR THE PERSONALIZATION AND REGISTRATION OF VEHICLE DEVICES

(75) Inventors: Albert Hafenscher, Vienna (AT); Jasja Tijink, Perchtoldsdorf (AT); Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 221 days.

(21) Appl. No.: 12/876,072

(22) Filed: Sep. 3, 2010

(65) Prior Publication Data

US 2011/0093315 A1 Apr. 21, 2011

(30) Foreign Application Priority Data

Oct. 15, 2009 (EP) .................................. 09450196

(51) Int. Cl.
*G07B 15/00* (2011.01)
*G07B 15/02* (2011.01)
*G01N 1/22* (2006.01)
*G01N 1/16* (2006.01)
*G01M 17/00* (2006.01)
*G06F 7/00* (2006.01)
*G06F 19/00* (2011.01)

(52) U.S. Cl. ...................... 705/13; 73/863.31; 701/31.4

(58) Field of Classification Search ............... 705/13
See application file for complete search history.

(56) References Cited

U.S. PATENT DOCUMENTS

| 6,690,293 | B2 * | 2/2004 | Amita ............................ 340/928 |
| 2007/0118758 | A1 * | 5/2007 | Takahashi et al. ............ 713/186 |
| 2011/0208568 | A1 * | 8/2011 | Deitiker et al. ................. 705/13 |
| 2011/0258439 | A1 * | 10/2011 | Orsini et al. .................. 713/165 |

FOREIGN PATENT DOCUMENTS

| DE | 101 04 499 A1 | 8/2002 |
| EP | 1 081 658 A2 | 3/2001 |
| EP | 1 870 302 A1 | 12/2007 |
| WO | WO 2006/050543 A1 | 5/2006 |

OTHER PUBLICATIONS

"Delphi Spotlights Range of Controls & Security Products at 2008 CES"; Wireless News; Dec. 7, 2007, pp. 1. from DIALOG.*
Extended European Search Report for corresponding European Patent Application No. 09450196.2, dated Mar. 12, 2010, 4pp.

* cited by examiner

*Primary Examiner* — John Hayes
*Assistant Examiner* — David J Clark
(74) *Attorney, Agent, or Firm* — Christie, Parker & Hale, LLP.

(57) ABSTRACT

Apparatus for personalization and registration of vehicle devices of different types in a road toll system, comprising: for each type of vehicle device, a respective personalization module that is configured to write personalization data into a vehicle device of this type and generate the associated registration data, which contains the personalization data, an interface module common to all personalization modules that is configured to receive their registration data and, following a release request, send it to a registration database of the road toll system, and a testing unit that reads out the personalization data of a personalized but not yet registered vehicle device, checks the registration data generated by the responsible personalization module for agreement of the personalization data contained therein with the read-out personalization data, and if it agrees, sends a release request with respect to this registration data to the interface module.

12 Claims, 1 Drawing Sheet

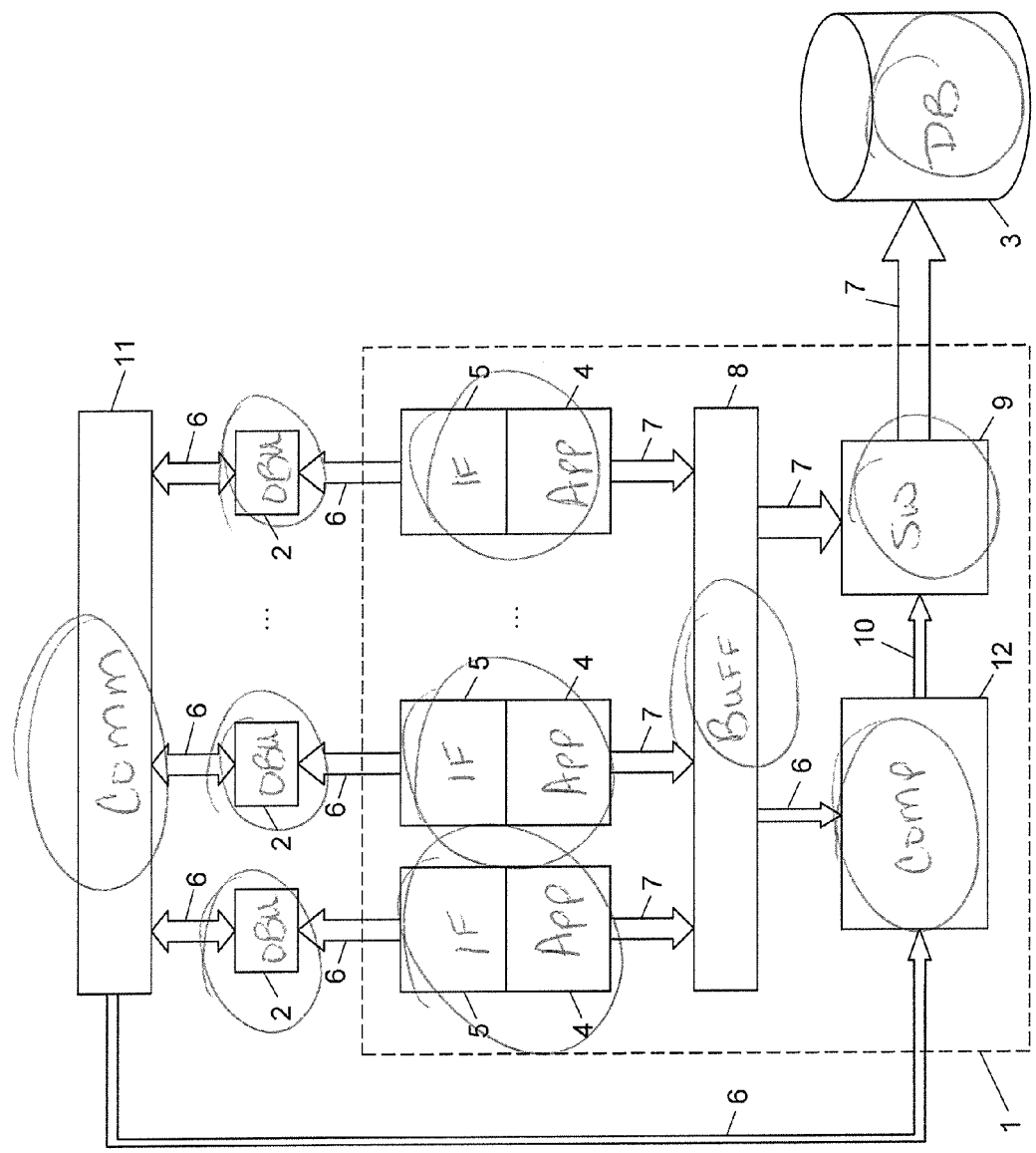

APPARATUS FOR THE PERSONALIZATION AND REGISTRATION OF VEHICLE DEVICES

CROSS-REFERENCE TO RELATED APPLICATION(S)

This application claims priority to European Patent Application No. 09 450 196.2, filed on Oct. 15, 2009, the contents of which are hereby expressly incorporated by reference.

FIELD OF THE INVENTION

The present invention relates to an apparatus for the personalization and registration of vehicle devices of different types in a road toll system.

BACKGROUND

For the operation of vehicle devices ("onboard units," OBUs) of different types, e.g., from different manufacturers, within one and the same road toll system, the OBUs must currently be personalized and registered in the system by a specific apparatus for each type of vehicle device. In this personalization, user or usage specific personalization data, e.g., name of the user, license plate number or toll class of the vehicle, etc., is written into the OBU. The above-mentioned registration of an OBU in the road toll system requires inputting the personalization data into a registration database of the toll road system, generally supplemented with additional data such as the address or bank account number of the user, technical data of the OBU, etc., which additional data, together with the personalization data, is referred to here as "registration data."

The use of a wide variety of type-specific personalization and registration apparatus involves a risk that, due to differing implementations of interface standards by manufacturers, or to malfunctions in individual apparatus, data errors could occur that could harm the integrity of the registration database of the road toll system.

SUMMARY

The invention overcomes these disadvantages and creates a personalization and registration apparatus for vehicle devices of various types that eliminates disruptions of the toll road system caused by malfunctions of individual device types.

In some embodiments, the invention includes for each type of vehicle device, a respective personalization module that is configured to write personalization data into a vehicle device of this type and generate associated registration data, which contains the personalization data, an interface module common to all personalization modules that is configured to receive their registration data and, following a release request, to send it to a registration database of the road toll system, and a testing unit that reads the personalization data of a personalized but not yet registered vehicle device, checks the registration data generated by the responsible personalization module for agreement of the personalization data contained therein with the personalization data that is read, and, if it agrees, sends a release request with respect to this registration data to the interface module.

In this manner the registration data of the individual device-specific personalization module is released for input into the central system only if the personalization data actually written into the OBU and the personalization data supplied by the personalization module with the registration data are in agreement. This assuredly prevents malfunctions in the personalization modules or the OBUs that could lead to data inconsistencies and thus a destruction of the integrity of the registration database.

An embodiment of the invention is distinguished in that each personalization module also generates a hash value of the registration data during the personalization of a vehicle device and writes it into the vehicle device, and the testing unit reads out this hash value from the vehicle device along with the others and, during the aforementioned checking, compares it to a hash value of the registration data it received from the personalization module. Thereby an additional validation criteria is created that makes it possible to double check not only the personalization data, but the entire registration data via the OBU and the testing unit.

In some embodiments, the device is preferably a PoS terminal (point-of-sale terminal) and the personalization modules are each formed by the combination of a vehicle device type-specific personalization application and a vehicle device type-specific communication interface to the vehicle device. In particular, the communication interface can be a DRSC or mobile phone interface.

Another preferred embodiment of the invention includes constructing the testing unit, for the purpose of reading-out the personalization data, to prompt the vehicle device to generate a standardized toll transaction of the road-toll system, which transaction reproduces the personalization data. Thereby the functionality of the OBU can be checked and simultaneously used as a criterion for the enabling of the input of the registration data into the central system.

It is particularly useful if the testing unit co-uses the communication interface of a selected personalization module. This selected personalization module can, for example, be the proprietary system of the registration database operator, which is accorded special trust, so that a "third-party" OBU personalized on the personalization module of a third-party manufacturer can then be validated and registered via the communication interface of the proprietary personalization module their The testing unit may use a transceiver beacon of the road toll system for communication with the vehicle devices, whereby the registration data is validated and released, for example, upon the first contact of an OBU with such a beacon.

BRIEF DESCRIPTION OF THE DRAWINGS

The invention will be described below with reference to an embodiment illustrated in the appended drawings, whose sole FIG. 1 shows a block schematic diagram of the apparatus according to the invention.

FIG. 1 shows an apparatus 1 for the personalization of vehicle devices or OBUs 2 and the registration thereof in a central registration database 3 of a road toll system.

DETAILED DESCRIPTION

The OBUs 2 can be of any desired type, where "type" is understood to mean both a given technical design or a given technical standard, respectively, as well as simply a given manufacturer for OBUs of one and the same technical standard.

For example, the OBUs 2 can be "self-localizing," i.e., they determine their position, for example, by means of a satellite navigation receiver and transfer their position records ("tracks") or toll fees calculated therefrom to a central unit, or they can be "infrastructure-localized" OBUs, whose position is determined, for example, by video cameras, laser scanners or by means of DSRC (dedicated short-range communication) or similar beacons and reported to the central unit of the toll system.

For each type of OBU 2, the apparatus 1 comprises a personalization module 4, 5 (three of which are shown here), which is composed of a type-specific (software) personalization application 4 and a type-specific (hardware) communication interface 5 for communication with the respective OBU 2.

The communication interface 5 can be of any desired type. It is preferably of the same type as that via which the OBU 2 handles its toll transactions with the road toll system, e.g., a mobile phone interface or a DSRC, WAVE (wireless access for vehicle environment), WLAN (wireless local area network), WiMAX, RFID (radio frequency identification) or infrared interface, etc.

The personalization application 4 preferably accepts user inputs from an operator at a terminal, e.g., a PoS terminal (point-of-sale terminal), in which case the entire apparatus 1 is preferably formed as a single PoS terminal. Alternatively, the personalization application 4 could also receive data from a remote access, e.g., via the Internet or from another data interface.

Based on the data input into the personalization application 4, or received from it, each personalization module 4, 5 carries out a personalization of OBUs 2 of "its" type, by writing personalization data 6, such as the name of the user, the license plate number of the vehicle, the account number of a toll fee debit account in the toll center etc., into the OBU 2. Such a personalization takes place, for example, in the first delivery of a factory-new OBU 2 to a user, or in the reassignment of an OBU 2, e.g., in case of a change of user or vehicle.

At the same time, the personalization module 4, 5 also generates associated registration data 7 for the registration database 3 of the road toll system, which contains the personalization data 6 as well as, if desired, additional data such as the address of the user, a link to a bank account and so on.

The registration data 7 is transferred from the personalization modules 4, 5 to a common interface module 8, 9 that consists of a buffer memory 8 and a controllable switch 9, to be understood in symbolic terms. The interface module 8, 9 sends the received registration data 7 on to the registration database 3 only if it receives a release request 10 for "opening" the switch 9.

The release request 10 is sent by a testing unit 11, 12 that is composed of a communication unit 11 and a comparison unit 12. The communication unit 11 can communicate with the OBUs 2 in order to read out the personalization data 6 written therein. The comparison unit 12 compares the personalization data 6 read out from an OBU 2 to the registration data 7 stored in the buffer memory 8 of the interface module 8,9 by the respective personalization module 4, 5, more precisely to the personalization data 6 contained therein, and in case of agreement sends the release request 10 to the switch 9 of the interface module 8, 9, whereupon the latter releases the respective registration data 7 for input into the registration database 3 and for further usage in the toll system.

The communication unit 11 of the testing unit 11, 12 preferably communicates with the OBUs 2 in the same manner as these communicate with the personalization modules 4, 5, which is in turn preferably the same manner with which the OBUs 2 communicate with the road toll system in operation, e.g., via a mobile phone, DSRC-, WAVE-, WLAN-, WiMAX-, RFID or infrared interface, etc. It is also possible for the testing unit 11, 12 to co-use the communication interface 5 of a selected personalization module 4, 5, i.e., for the communication unit 11 to coincide with or be identical to this communication interface 5. Alternatively, the communication unit 11 could also be formed by a transceiver beacon of the road toll system, e.g., by the first radio beacon that encounters a "freshly" personalized, not yet registered OBU 2 on its way after leaving the PoS terminal.

To read out the personalization data 6 from the OBUs 2, the testing unit 11, 12 can, in particular, also use a standardized toll transaction of the road toll system, which transaction supplies not only the personalization data 6 but at the same time also indicates the standards-conforming functioning of the OBU 2. In this manner, the functioning of the OBU 2 can be integrated into the criterion for releasing the registration data 7.

An additional checking option is the use and checking of hash values of the registration information 7. The personalization modules 4, 5 can generate a hash value of the registration data 7 during the personalization and write it into the OBU 2 together with the personalization data 6. The testing unit 11, 12 reads out this hash value together with the personalization data 6 from the OBU 2 and compares the read-out hash value to a hash value formed by the personalization modules 4, 5 and stored together with the registration data 7 in the buffer memory 8, or to a hash value formed by the testing unit 11, 12 itself from the registration data 7 in the buffer memory 8. Only if, with the personalization data 6, these hash values also agree the release request 10 is sent to the interface module 8, 9.

The invention is not restricted to the illustrated embodiment, but rather comprises all variants and modifications that fall within the scope of the appended claims.

The invention claimed is:

1. An apparatus for personalization and registration of vehicle devices of different types in a road toll system, comprising:
    for each type of vehicle device, a respective personalization module that is configured to write personalization data into a vehicle device and generate associated registration data, which contains the personalization data;
    an interface module common to all personalization modules that is configured to receive the registration data and, following a release request, send the received registration data to a centralized registration database of the road toll system remote from the vehicle devices for storing the registration data; and
    a testing unit that reads out the personalization data of a personalized but not yet registered vehicle device, checks the registration data generated by the respective personalization module for agreement of the personalization data contained therein with the read-out personalization data, and in case of agreement, sends a release request with respect to said registration data to the interface module,
    wherein the apparatus is a point-of-sale (PoS) terminal and each of the personalization modules is formed by a combination of a vehicle device type-specific personalization application and a vehicle device type-specific communication interface to the vehicle device.

2. The apparatus according to claim 1, wherein each personalization module generates a hash value of the registration data during the personalization of a vehicle device and writes the hash value into the vehicle device, and wherein the testing unit reads out said hash value from the vehicle device and compares the hash value to a hash value of the registration data received from the personalization module, during said checking of the registration data.

3. The apparatus according to claim 1, wherein the communication interface is a conventional dedicated short-range communication (DSRC) or mobile phone interface.

4. The apparatus according to claim 1, wherein the testing unit is configured to prompt the vehicle device to generate a standardized toll transaction of the road toll system, which reproduces the personalization data.

5. The apparatus according to claim 4, wherein the testing unit co-uses the communication interface of a selected personalization module.

6. The apparatus according to claim 4, wherein the testing unit uses a transceiver beacon of the road toll system for communication with the vehicle devices.

7. An apparatus for personalization and registration of vehicle devices of different types in a road toll system, comprising:
   for each type of vehicle device, a respective personalization module that is configured to write personalization data into a vehicle device and generate associated registration data, which contains the personalization data;
   an interface module common to all personalization modules that is configured to receive the registration data and, following a release request, send the received registration data to a registration database of the road toll system; and
   a testing unit that reads out the personalization data of a personalized but not yet registered vehicle device, checks the registration data generated by the respective personalization module for agreement of the personalization data contained therein with the read-out personalization data, and in case of agreement, sends a release request with respect to said registration data to the interface module, wherein the apparatus is a point-of-sale (PoS) terminal and each of the personalization modules is formed by a combination of a vehicle device type-specific personalization application and a vehicle device type-specific communication interface to the vehicle device.

8. The apparatus according to claim 7, wherein each personalization module generates a hash value of the registration data during the personalization of a vehicle device and writes the hash value into the vehicle device, and wherein the testing unit reads out said hash value from the vehicle device and compares the hash value to a hash value of the registration data received from the personalization module, during said checking of the registration data.

9. The apparatus according to claim 7, wherein the testing unit is configured to prompt the vehicle device to generate a standardized toll transaction of the road toll system, which reproduces the personalization data.

10. The apparatus according to claim 9, wherein the testing unit co-uses the communication interface of a selected personalization module.

11. The apparatus according to claim 9, wherein the testing unit uses a transceiver beacon of the road toll system for communication with the vehicle devices.

12. The apparatus according to claim 7, wherein the communication interface is a conventional dedicated short-range communication (DSRC) or mobile phone interface.

\* \* \* \* \*